United States Patent
Lim et al.

(10) Patent No.: US 8,483,137 B2
(45) Date of Patent: Jul. 9, 2013

(54) METHOD FOR TRANSMITTING SIGNAL USING A FRAME OF A PREDETERMINED CYCLIC PREFIX LENGTH IN A WIRELESS COMMUNICATION SYSTEM

(75) Inventors: Dong Guk Lim, Anyang-si (KR); Han Gyu Cho, Anyang-si (KR); Sung Ho Moon, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 13/148,660

(22) PCT Filed: Apr. 28, 2010

(86) PCT No.: PCT/KR2010/002661
§ 371 (c)(1),
(2), (4) Date: Aug. 9, 2011

(87) PCT Pub. No.: WO2010/128769
PCT Pub. Date: Nov. 11, 2010

(65) Prior Publication Data
US 2012/0039221 A1    Feb. 16, 2012

Related U.S. Application Data

(60) Provisional application No. 61/176,117, filed on May 7, 2009.

(30) Foreign Application Priority Data

Dec. 18, 2009   (KR) .......................... 10-2009-0127033

(51) Int. Cl.
    *H04W 4/00*       (2009.01)
(52) U.S. Cl.
    USPC ......................................... 370/328; 370/338

(58) Field of Classification Search
    USPC .................................. 370/280, 328, 329, 338
    See application file for complete search history.

(56) References Cited

U.S. PATENT DOCUMENTS

| 8,059,676 | B2 * | 11/2011 | Moon et al. .................... 370/464 |
| 8,238,300 | B2 * | 8/2012 | Moon et al. .................... 370/329 |
| 2007/0206561 | A1 | 9/2007 | Son et al. |
| 2007/0280098 | A1 | 12/2007 | Bhatt et al. |
| 2009/0219842 | A1 * | 9/2009 | Moon et al. .................... 370/294 |
| 2010/0111008 | A1 * | 5/2010 | Ishii ............................... 370/329 |
| 2010/0246456 | A1 * | 9/2010 | Suo et al. ....................... 370/280 |
| 2011/0044215 | A1 * | 2/2011 | Kim et al. ...................... 370/280 |
| 2011/0096783 | A1 * | 4/2011 | Cai et al. ..................... 370/395.4 |
| 2011/0103406 | A1 * | 5/2011 | Cai et al. ....................... 370/480 |

* cited by examiner

*Primary Examiner* — Warner Wong
(74) *Attorney, Agent, or Firm* — Lee, Hong, Degerman, Kang & Waimey

(57) ABSTRACT

A method for transmitting a signal using a frame having a predetermined cyclic prefix (CP) in a wireless communication system is disclosed. The method for transmitting a signal using a frame having a predetermined cyclic prefix (CP) length in a wireless communication system that supports a plurality of cells comprises receiving the signal using a first frame from a base station; and transmitting the signal to the base station using the first frame, wherein the first frame is supported by a first cell of the plurality of cells and is different from a second frame supported by a second cell of the plurality of cells, the first frame has a structure where a overlap region between an uplink region of the first frame and a downlink region of the second frame or an overlap region between a downlink region of the first frame and an uplink region of the second frame is punctured, and a CP length of the first frame is different from that of the second frame.

16 Claims, 10 Drawing Sheets

METHOD FOR TRANSMITTING SIGNAL USING A FRAME OF A PREDETERMINED CYCLIC PREFIX LENGTH IN A WIRELESS COMMUNICATION SYSTEM

CROSS-REFERENCE TO RELATED APPLICATIONS

This application is a 371 U.S. national stage application of International Application No. PCT/KR2010/002661, filed on Apr. 28, 2010, which claims priority to Korean Application No. 10-2009-0127033, filed on Dec. 18, 2009, and U.S. Provisional Application Ser. No. 61/176,117, filed on May 7, 2009, the contents of which are incorporated by reference herein in their entirety.

TECHNICAL FIELD

The present invention relates to a method for transmitting a signal using a frame of a predetermined cyclic prefix (CP) length in a wireless communication system.

BACKGROUND ART

An IEEE 802.16m system can support both a frequency division duplex (FDD) scheme that includes half-frequency division duplex (H-FDD) user equipment operation and a time division duplex (TDD) scheme. The IEEE 802.16m system uses an orthogonal frequency division multiplexing access (OFDMA) as a multiplex access mode in a downlink and an uplink. OFDMA parameters will be illustrated in Table 1 below.

5 MHz, 10 MHz, and 20 MHz, each radio frame of 5 ms includes eight subframes. One subframe can be allocated for downlink or uplink transmission. The first type subframe includes six OFDMA symbols, and the second type subframe includes seven OFDMA symbols, and the third type subframe includes five OFDMA symbols.

The basic frame can be applied to both the FDD scheme and the TDD scheme including H-FDD user equipment operation. In the TDD system, two switching points exist at each radio frame. The switching points can be defined in accordance with directional variation from the downlink to the uplink or from the uplink to the downlink.

The H-FDD user equipment can be included in the FDD system, and a frame is similar to a TDD frame in view of the H-FDD user equipment. However, downlink and uplink transmission occurs at two separate frequency bandwidths. Transmission gaps between the downlink and the uplink are required to switch transmitting and receiving circuits.

FIG. 2 is a diagram illustrating an example of a TDD frame having a downlink to uplink ratio of 5:3.

Referring to FIG. 2, it is supposed that an OFDMA symbol duration is 102.857 μs and has a cyclic prefix (CP) length corresponding to ⅛ of a useful symbol length Tu. In this case, the first type subframe and the third type subframe respectively have lengths of 0.617 ms and 0.514 ms. The last downlink subframe SF4 is a third type subframe. The transmit transition gap (TTG) and receive transition gap (RTG) are 105.714 μs and 60 μs, respectively. In other numerology, the number of subframes per frame may be different from the number of symbols within a subframe.

FIG. 3 is a diagram illustrating an example of a frame in an FDD mode.

TABLE 1

| Nominal Channel Bandwidth (MHz) | | | 5 | 7 | 8.75 | 10 | 20 |
|---|---|---|---|---|---|---|---|
| Over-sampling Factor | | | 28/25 | 8/7 | 8/7 | 28/25 | 28/25 |
| Sampling Frequency (MHz) | | | 5.6 | 8 | 10 | 11.2 | 22.4 |
| FFT Size | | | 512 | 1024 | 1024 | 1024 | 2048 |
| Sub-Carrier Spacing (kHz) | | | 10.937500 | 7.812500 | 9.765625 | 10.937500 | 10.937500 |
| Useful Symbol Time $T_u$ (μs) | | | 91.429 | 128 | 102.4 | 91.429 | 91.429 |
| Cyclic Prefix (CP) $T_g = ⅛ T_u$ | Symbol Time $T_s$ (μs) | | 102.857 | 144 | 115.2 | 102.857 | 102.857 |
| | FDD | Number of OFDM symbols per Frame | 48 | 34 | 43 | 48 | 48 |
| | | Idle time (μs) | 62.857 | 104 | 46.40 | 62.857 | 62.857 |
| | TDD | Number of OFDM symbols per Frame | 47 | 33 | 42 | 47 | 47 |
| | | TTG + RTG (μs) | 165.714 | 248 | 161.6 | 165.714 | 165.714 |
| Cyclic Prefix (CP) $T_g = 1/16 T_u$ | Symbol Time $T_s$ (μs) | | 97.143 | 136 | 108.8 | 97.143 | 97.143 |
| | FDD | Number of OFDM symbols per Frame | 51 | 36 | 45 | 51 | 51 |
| | | Idle time (μs) | 45.71 | 104 | 104 | 45.71 | 45.71 |
| | TDD | Number of OFDM symbols per Frame | 50 | 35 | 44 | 50 | 50 |
| | | TTG + RTG (μs) | 142.853 | 240 | 212.8 | 142.853 | 142.853 |
| Cyclic Prefix (CP) $T_g = ¼ T_u$ | Symbol Time $T_s$ (μs) | | 114.286 | [TBD] | [TBD] | 114.286 | 114.286 |
| | FDD | Number of OFDM symbols per Frame | 43 | [TBD] | [TBD] | 43 | 43 |
| | | Idle time (μs) | 85.694 | [TBD] | [TBD] | 85.694 | 85.694 |
| | TDD | Number of OFDM symbols per Frame | 42 | [TBD] | [TBD] | 42 | 42 |
| | | TTG + RTG (μs) | 199.98 | [TBD] | [TBD] | 199.98 | 199.98 |

Hereinafter, a frame of the IEEE 802.16m system will be described in brief.

FIG. 1 is a diagram illustrating a basic frame in an IEEE 802.16m system.

Referring to FIG. 1, each superframe of 20 ms includes four same sized radio frames of 5 ms, and starts with a super frame header (SFH). If the same OFDMA parameters are used as illustrated in Table 1 at any one of channel bandwidths Referring to FIG. 3, a base station that supports an FDD scheme can support a half-duplex user equipment and a full-duplex user equipment at the same time, wherein the half-duplex user equipment and the full-duplex user equipment are operated using the same radio frequency carrier. A user equipment that supports an FDD scheme should use any one of H-FDD scheme and FDD scheme. For both downlink transmission and uplink transmission, all subframes can be used.

Downlink and uplink transmission can be divided in a frequency domain. One super frame is divided into four frames, wherein one frame includes eight subframes.

FIG. 4 is a diagram illustrating TDD and FDD frames having a CP length corresponding to $\frac{1}{16}$ of a useful symbol length Tu.

Referring to FIG. 4, for channel bandwidths of 5 MHz, 10 MHz, and 20 MHz, a frame of the IEEE 802.16m system has five first type subframes and three second type subframes in an FDD scheme, and six first type subframes and two second type subframes in a TDD scheme, wherein the frame has a CP length corresponding to $\frac{1}{16}$ of a useful symbol length Tu.

Supposing that an OFDMA symbol duration is 97.143 μs and has a CP length corresponding to $\frac{1}{16}$ of a useful symbol length Tu, the first type subframe and the second type subframe have lengths of 0.583 ms and 0.680 ms, respectively. The TTG and the RTG are 82.853 μs and 60 μs, respectively. In other numerology, the number of subframes per frame may be different from the number of symbols within a subframe. In case of the FDD, a frame structure (the number of subframes, type, etc.) of an uplink should be the same as that of a downlink for each specific frame.

In the IEEE 802.16m system, when a frame having a CP length corresponding to $\frac{1}{4}$ of a useful symbol length is defined for bandwidths of 5, 10, 20, 7, and 8.75 MHz, a frame can be configured by a subframe smaller than a frame having another CP length by one to use first type subframes which are basic subframes. In this case, the frame having a CP length corresponding to $\frac{1}{4}$ of a useful symbol length causes interference due to misalignment with a frame having another CP length. Accordingly, for frames having different CP lengths, a method for uplink alignment and downlink alignment without interference will be required.

DISCLOSURE OF INVENTION

Technical Problem

Accordingly, the present invention is directed to a method for transmitting a signal using a frame of a predetermined cyclic prefix (CP) length in a wireless communication system, which substantially obviates one or more problems due to limitations and disadvantages of the related art.

An object of the present invention is to provide a method for preventing interference between frames by aligning frames to which predetermined CP lengths are applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for transmitting a signal using a frame having a predetermined cyclic prefix (CP) length in a wireless communication system that supports a plurality of cells comprises receiving the signal using a first frame from a base station; and transmitting the signal to the base station using the first frame, wherein the first frame is supported by a first cell of the plurality of cells and is different from a second frame supported by a second cell of the plurality of cells, the first frame has a structure where a overlap region between an uplink region of the first frame and a downlink region of the second frame or an overlap region between a downlink region of the first frame and an uplink region of the second frame is punctured, and a CP length of the first frame is different from that of the second frame.

Preferably, the CP length of the first frame is $\frac{1}{4}$ of a useful symbol length, and the number of subframes included in the first frame is smaller than the number of subframes included in the second frame by 1.

Preferably, if the downlink region of the first frame is overlapped with the uplink region of the second frame, a predetermined number of symbols of a last subframe of downlink subframes of the first frame are punctured.

Preferably, if the uplink region of the first frame is overlapped with the downlink region of the second frame, a predetermined number of symbols of a first subframe of uplink subframes of the first frame are punctured.

Preferably, a subframe that includes the overlapped region is punctured at the first frame.

Preferably, the first frame and the second frame are time division duplex (TDD) frames.

Preferably, the method further comprises receiving information of the punctured region.

Preferably, the information of the punctured region includes information of the punctured symbol or the punctured subframe.

In another aspect of the present invention, a user equipment in a wireless communication system that supports a plurality of cells comprises a receiving unit receiving a signal using a first frame from a base station; a transmitting unit transmitting the signal to the base station using the first frame; and a processing unit controlling the receiving unit and the transmitting unit, wherein the system supports a plurality of cells, the first frame is supported by a first cell of the plurality of cells and is different from a second frame supported by a second cell of the plurality of cells, the first frame has a structure where a overlap region between an uplink region of the first frame and a downlink region of the second frame or an overlap region between a downlink region of the first frame and an uplink region of the second frame is punctured, and a CP length of the first frame is different from that of the second frame.

Preferably, the CP length of the first frame is $\frac{1}{4}$ of a useful symbol length, and the number of subframes included in the first frame is smaller than the number of subframes included in the second frame by 1.

Preferably, if the downlink region of the first frame is overlapped with the uplink region of the second frame, a predetermined number of symbols of a last subframe of downlink subframes of the first frame are punctured.

Preferably, if the uplink region of the first frame is overlapped with the downlink region of the second frame, a predetermined number of symbols of a first subframe of uplink subframes of the first frame are punctured.

Preferably, a subframe that includes the overlapped region is punctured at the first frame.

Preferably, the first frame and the second frame are time division duplex (TDD) frames.

Preferably, the receiving unit receives information of the punctured region.

Preferably, the information of the punctured region includes information of the punctured symbol or the punctured subframe.

Advantageous Effects of Invention

According to the embodiments of the present invention, if a part of a downlink region is overlapped with a part of an uplink region between frames to which different CP lengths are applied, one of the part of the downlink region and the part of the uplink region is punctured, whereby interference between the frames having different CP lengths can be reduced. Also, since a subframe defined in the system is used, it is not necessary to define a subframe which is newly added.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
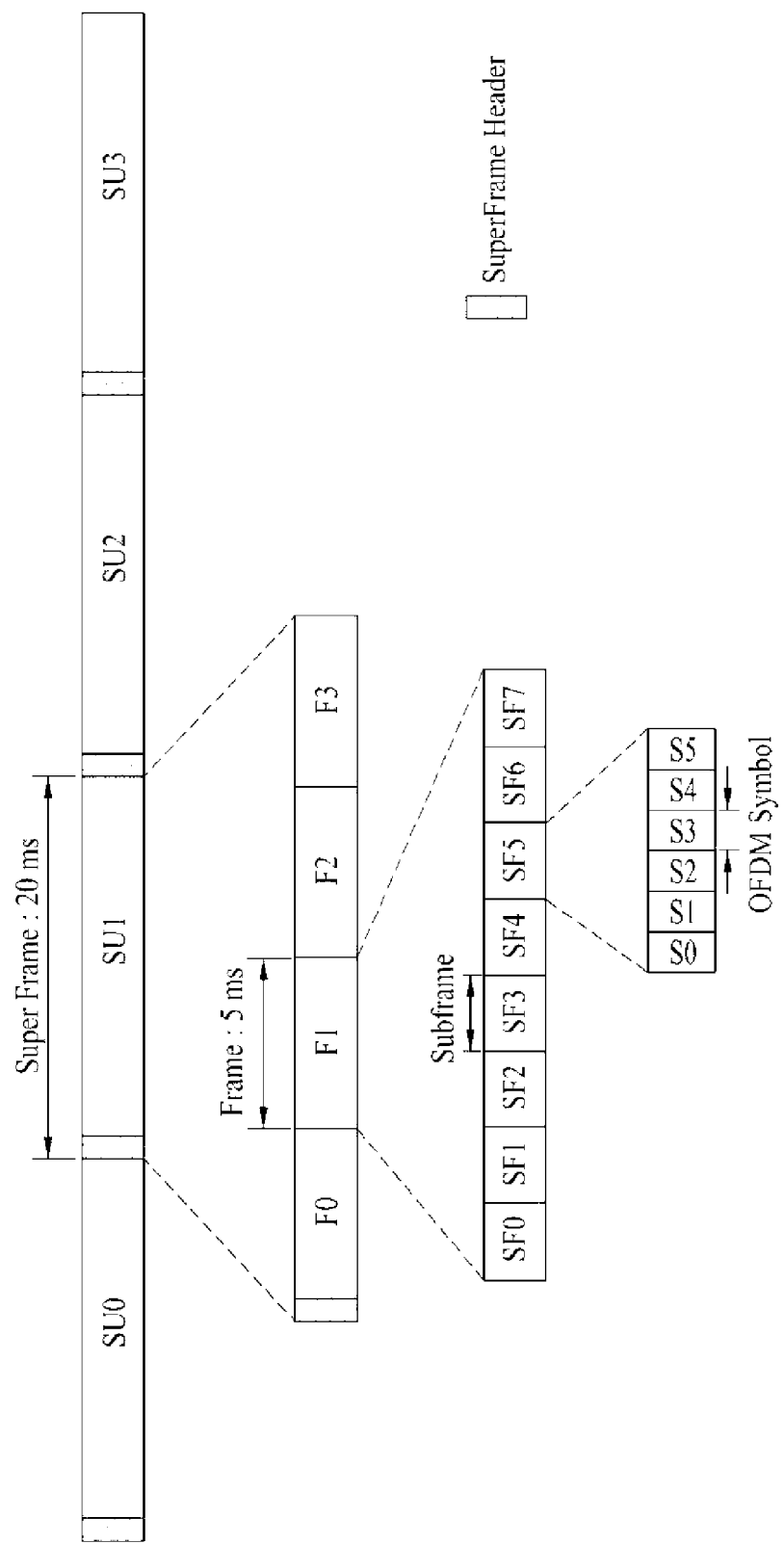
FIG. 1 is a diagram illustrating a basic frame in an IEEE 802.16m system.
Figure 2:
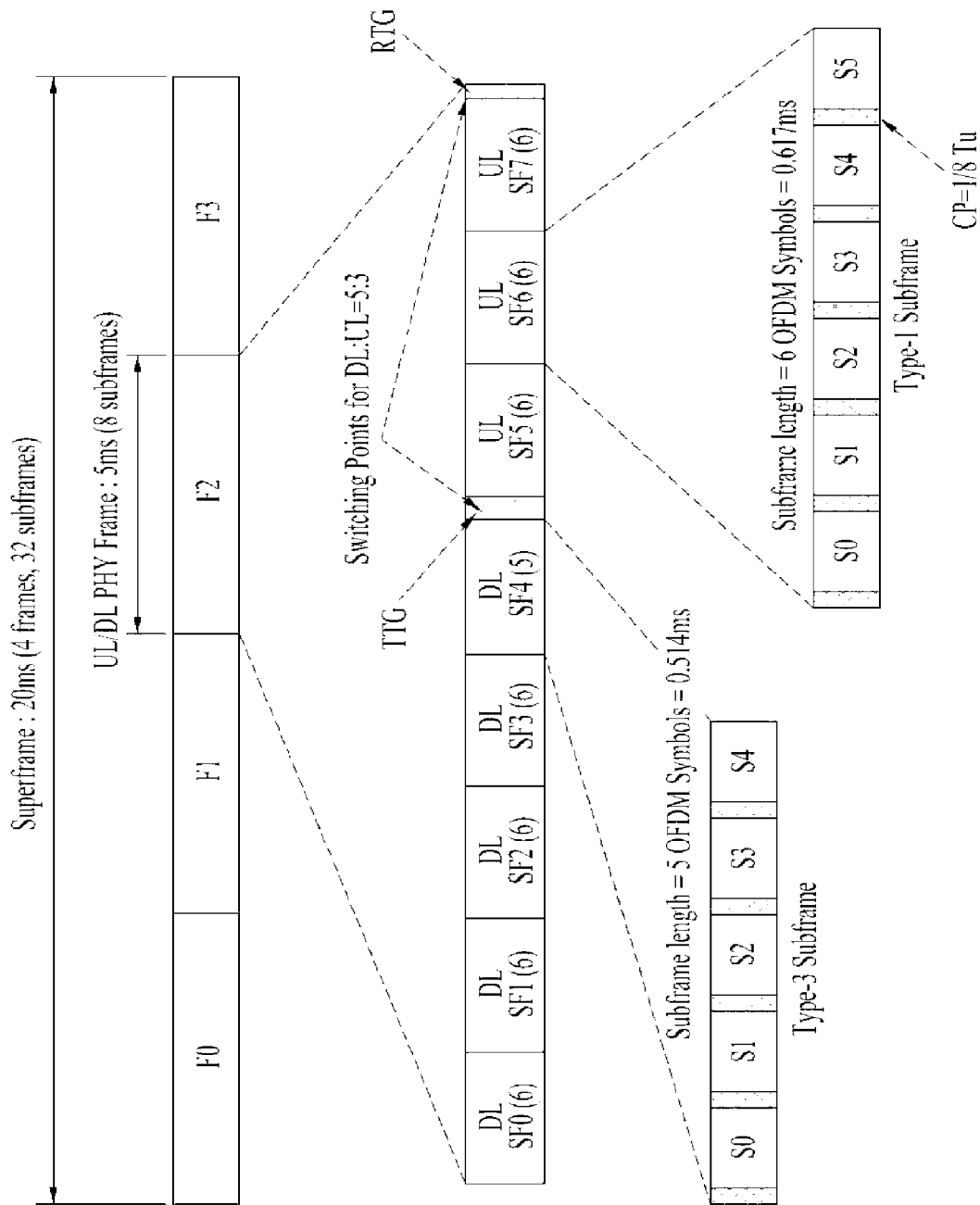
FIG. 2 is a diagram illustrating an example of a TDD frame having a downlink to uplink ratio of 5:3.
Figure 3:
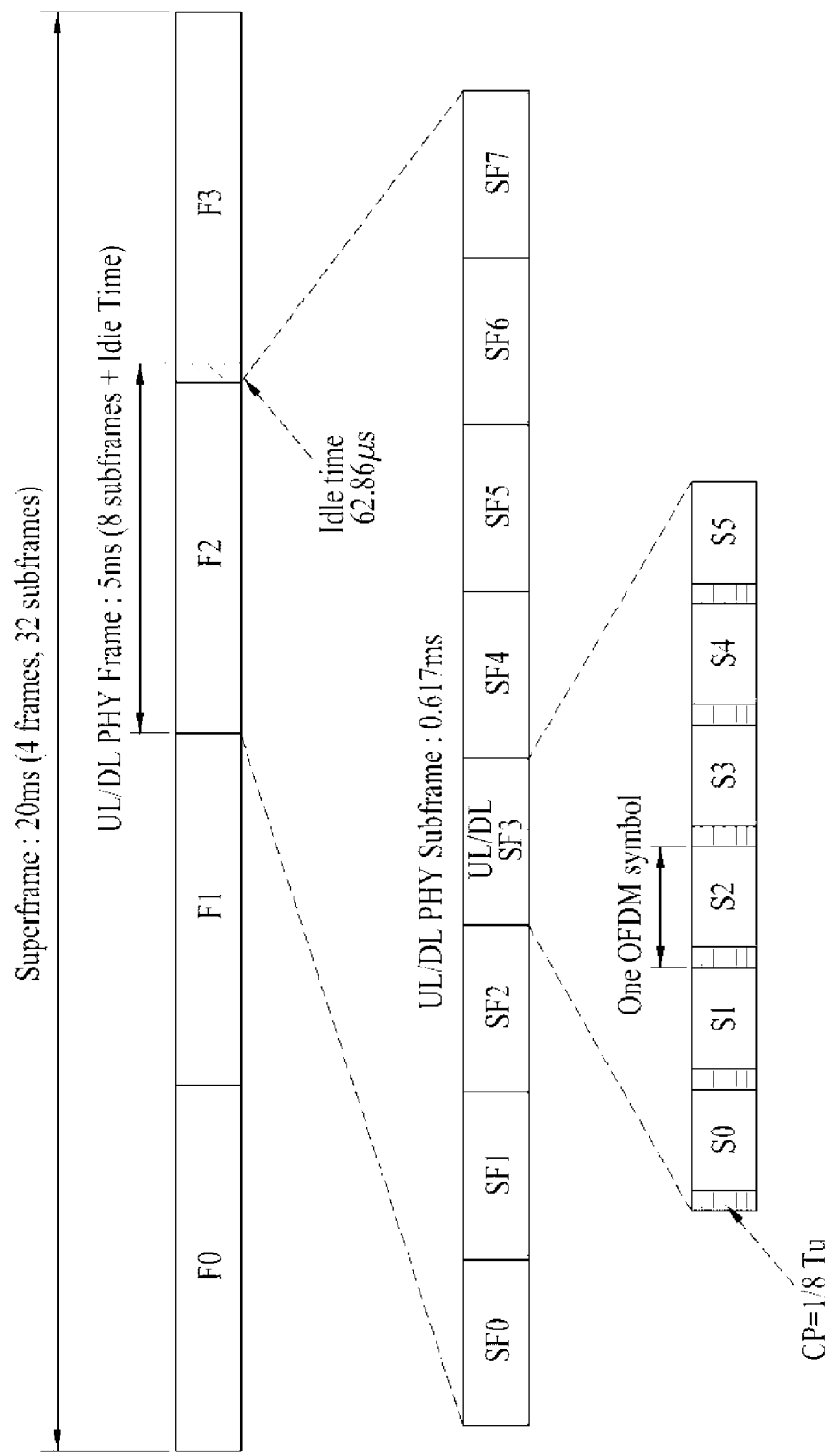
FIG. 3 is a diagram illustrating an example of a frame in an FDD scheme.
Figure 4:
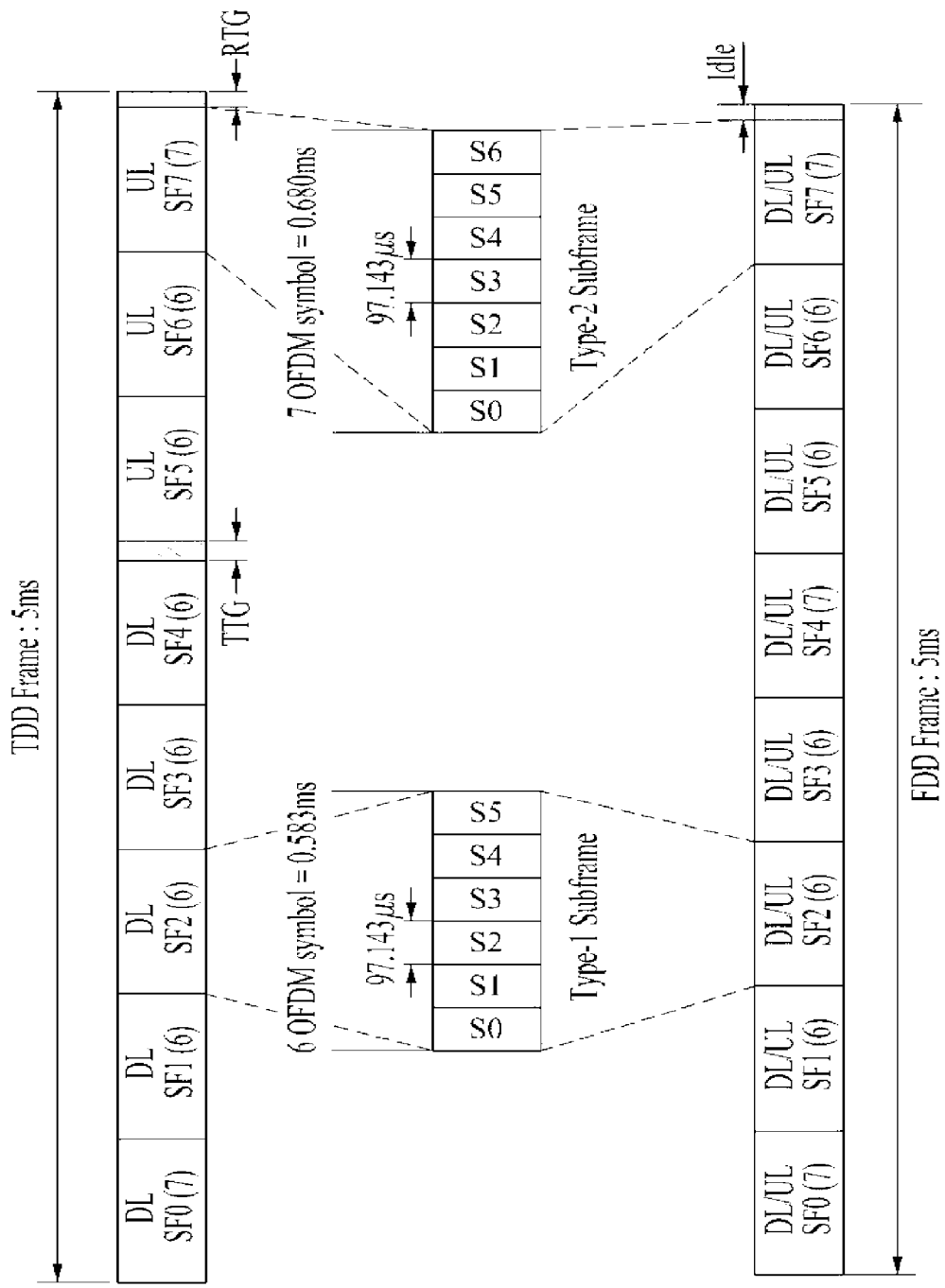
FIG. 4 is a diagram illustrating TDD and FDD frames having a CP length corresponding to $\frac{1}{16}$ of a useful symbol length Tu.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following description will be made based on, but not limited to, some terminologies. And, other random terminologies may be designated to refer to the same meaning. Wherever possible, the same reference numbers will be used throughout the drawings to refer to the same or like parts.

In the description, when some part includes some element, unless specified otherwise, it means that the corresponding part may further include any other element.

The embodiments of the present invention can be supported by standard documents disclosed in at least one of wireless access systems, i.e., IEEE (Institute of Electrical and Electronics Engineers) 802 system, 3GPP system, 3GPP LTE (3rd Generation Partnership Project Long Term Evolution) system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

The basic principle of orthogonal frequency division multiplexing (OFDM), which is a multiplexing carrier modulation mode, in a wireless communication system will be described as follows.

In the OFDM system, data stream having a high rate is divided into a large number of data streams having a slow rate. This is to simultaneously transmit the data streams by using a plurality of carriers. Each of the plurality of carriers is called a sub-carrier. Since orthogonality exists among the subcarriers in the OFDM system, the carriers can be detected by a receiving side even in the case that frequency components of the carriers overlap with one another. The data stream having the high rate is converted into a plurality of data streams having the slow rate by a serial-to-parallel converter, each of the plurality of data streams converted in parallel is multiplied by each of the sub-carriers, the data streams are added to one another, and the added data streams are transmitted to the receiving side.

The plurality of parallel data streams generated by the serial-to-parallel converter can be transmitted by the plurality of sub-carriers using an Inverse Discrete Fourier Transform (IDFT). In this case, the IDFT can be efficiently implemented using an Inverse Fast Fourier Transform (IFFT). Since a symbol duration of each of the subcarriers having the slow rate is increased, a relative signal dispersion on a time axis, which is generated by multi-path delay spread, is decreased.

In the wireless communication using such an OFDM system, inter-symbol interference can be reduced in such a manner that a guard interval longer than delay spread of a channel is inserted between OFDM symbols. In other words, while each symbol is being transmitted through a multi path channel, a guard interval longer than maximum delay spread of a channel is inserted between contiguous symbols. At this time, in order to prevent inter-subcarrier orthogonality from being destroyed, a signal of the last interval (i.e., guard interval) of a useful symbol interval is copied and arranged at a start part of a symbol. This will be referred to as cyclic prefix (CP).

Figure 5:
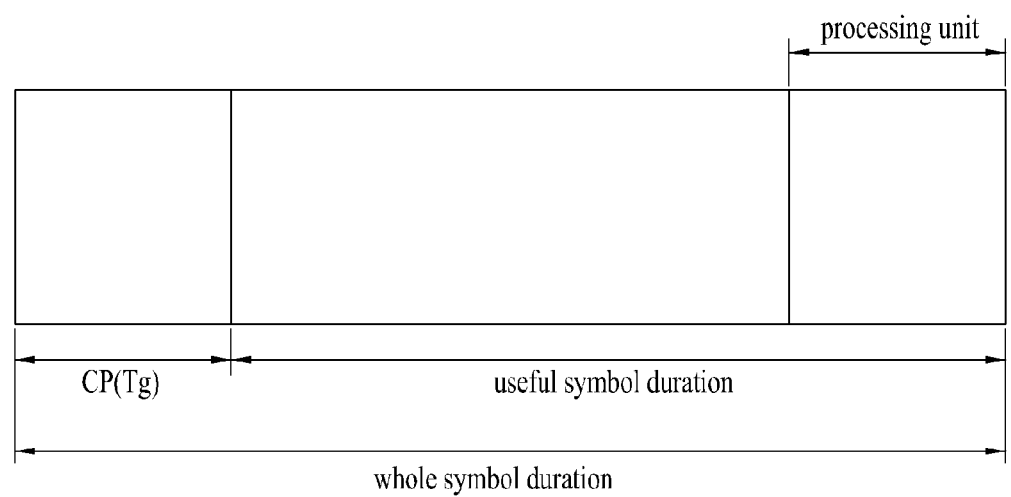
FIG. 5 is a diagram illustrating an example of a symbol structure that includes a cyclic prefix (CP)

FIG. 5 is a diagram illustrating an example of a symbol structure that includes a cyclic prefix (CP).

Referring to FIG. 5, a symbol period (Ts) becomes a sum of a useful symbol interval ($T_b$) and a guard interval ($T_g$). A receiving side performs demodulation by selecting data corresponding to the useful symbol interval after removing the guard interval. A transmitting side and the receiving side can be synchronized with each other using a cyclic prefix symbol, and can maintain orthogonality between data symbols. In the present invention, a symbol may be an OFDMA symbol.

Hereinafter, frames (TDD frame and FDD frame) in the IEEE 802.16m system will be described, wherein the frames have a CP length (hereinafter, referred to as a CP length of ¼ $T_b$) corresponding to ¼ of a useful symbol length at a channel bandwidth of 8.75 MHz. Also, a TDD frame that can coexist with a TDD frame having a CP length of ⅛ $T_b$ or a CP length of ⅟16 $T_b$ for a channel bandwidth of 8.75 MHz will be described. Furthermore, an FDD frame having many common features with the TDD frame suggested in the present invention will be described.

In the IEEE 802.16m system, four types of subframes exist. The first type subframe includes six OFDMA symbols, the second type subframe includes seven OFDMA symbols, the third type subframe includes five OFDMA symbols, and the fourth type subframe includes nine OFDMA symbols. In this case, the fourth type subframe can be used in a frame at a channel bandwidth of 8.75 MHz.

Hereinafter, a method for frame alignment according to an uplink to downlink ratio between a first TDD frame and a second TDD frame will be described, wherein the first TDD frame has a CP length (hereinafter, referred to as a CP length of ¼ $T_b$) corresponding to ¼ of a useful symbol length at channel bandwidths of 5, 10, 20, 7, and 8.75 MHz and the second TDD frame has a CP length (hereinafter, referred to as a CP length of ⅛ $T_b$) corresponding to ⅛ of a useful symbol length and a CP length (hereinafter, referred to as a CP length of ⅟16 $T_b$) corresponding to ⅟16 of a useful symbol length at the same bandwidth.

Although the TDD frame of the IEEE 802.16m system, which has a CP length of ¼ $T_b$, includes the same number of subframes as that of a frame having another CP length, in order to much use the basic subframe, i.e., the first type subframe, the frame can be configured by using the number of subframes smaller than the number of subframes of the existing frame by one.

For example, in a frame structure having a CP length of ⅛ $T_b$ and a CP length of ⅟16 $T_b$ at bandwidths of 5, 10, and 20 MHz, one frame includes eight subframes. However, in a frame structure having a CP length of ¼ $T_b$, one frame includes seven subframes. Since a frame having a CP length of ¼ $T_b$ for the same bandwidth is configured using the number of subframes different from the number of subframes in the existing frame having a CP length different from the CP length of ¼ $T_b$, the part of the uplink region is overlapped with the part of the downlink region between the frame having a CP length of ¼ $T_b$ and the frame having a CP length of ⅛ $T_b$ or between the frame having a CP length of ¼ $T_b$ and the frame having a CP length of ⅟16 $T_b$, whereby interference may be caused.

For example, if the CP length of ¼ $T_b$, the CP length of ⅛ $T_b$, and the CP length of ⅟16 $T_b$ are simultaneously used, i.e., if signal transmission is performed using the frame having the CP length of ¼ $T_b$ in one macro-cell and signal transmission is performed using the frame having the CP length of ⅛ $T_b$ or the CP length of ¼ $T_b$ in a pico-cell, a femto-cell or a relay, a switching point of the uplink and the downlink of the frame used in the macro cell may not be aligned with a switching point of the uplink and the downlink of the frame used in the pico-cell, the femto-cell, or the relay.

As a result, the uplink transmission region of the macro-cell may be overlapped with the downlink transmission region of the pico-cell, the femto-cell or the relay, or the downlink transmission region of the macro-cell may be overlapped with the uplink transmission region of the pico-cell, the femto-cell or the relay, whereby interference may occur.

Also, as another example, when the CP lengths are different from each other between neighboring cells (for example, CP length of ¼ $T_b$ and CP length of ⅛ $T_b$, or CP length of ¼ $T_b$ and CP length of ⅟16 $T_b$), in case of a user equipment located in the edge between two cells, the switching points between the uplink and the downlink of the frames used in the two cells may not be aligned with each other. As a result, the uplink transmission region and the downlink transmission region between the neighboring cells are overlapped with each other, whereby interference may occur.

Also, in a state that multi-carriers are supported through two neighboring carriers, when different CP lengths are used by each carrier (for example, CP length of ¼ $T_b$ and CP length of ⅛ $T_b$, or CP length of ¼ $T_b$ and CP length of ⅟16 $T_b$), the switching points between the uplink and the downlink of the frames used in the neighboring carriers may not be aligned with each other. As a result, the uplink region and the downlink region are overlapped with each other, whereby interference may occur.

Accordingly, as the switching point between the downlink and the uplink of the frame having the CP length of ¼ $T_b$ is not aligned with the switching point between the downlink and the uplink of the frame having another CP length different from the CP length of ¼ $T_b$, to solve such a problem, there is provided a method for preventing interference between the frames by puncturing some symbols or subframes overlapped with the uplink region or the downlink region of the frame having another CP length different from the CP length of ¼ $T_b$ in the downlink region or the uplink region of the frame having the CP length of ¼ $T_b$.

In order to remove interference due to overlap of the downlink region and the uplink region between the frames having different CP lengths, a case where one of the downlink region and the uplink region which are overlapped with each other is punctured will be described in detail.

In the case that one symbol is punctured in the downlink region, since one symbol (the last symbol of the last downlink subframe) is punctured to remove the overlap region, the subframe type is changed to a subframe type having a symbol reduced by one. For example, if the last subframe of the downlink is the first type subframe having six symbols, it is changed to the third type subframe having five symbols.

If the last subframe of the downlink is the second type subframe, it is changed to the first type subframe.

If two or more symbols should be punctured in the downlink region and the punctured subframe includes four or less symbols, the corresponding subframe can be punctured for frame alignment, whereby a new type subframe having four symbols is not generated. Also, for frame alignment, the subframe can be reconfigured by the remaining symbols except for the punctured symbol.

Meanwhile, in the same manner as that frame alignment is performed after interference between frames having different CP lengths is removed using puncture of the symbol or subframe in the downlink, the symbol or subframe of the uplink region overlapped with the downlink region can be punctured for frame alignment between different CP lengths. Also, for frame alignment, the subframe can be reconfigured by the remaining symbols except for the punctured symbol.

If the first symbol of the first subframe in the uplink region is punctured, the first subframe is changed to the subframe type having symbols reduced by one. In this case, the first type subframe is changed to the third type subframe, and the second type subframe is changed to the first type subframe. At this time, a new type subframe where the first symbol is not used can be configured by the existing subframe.

Figure 6:
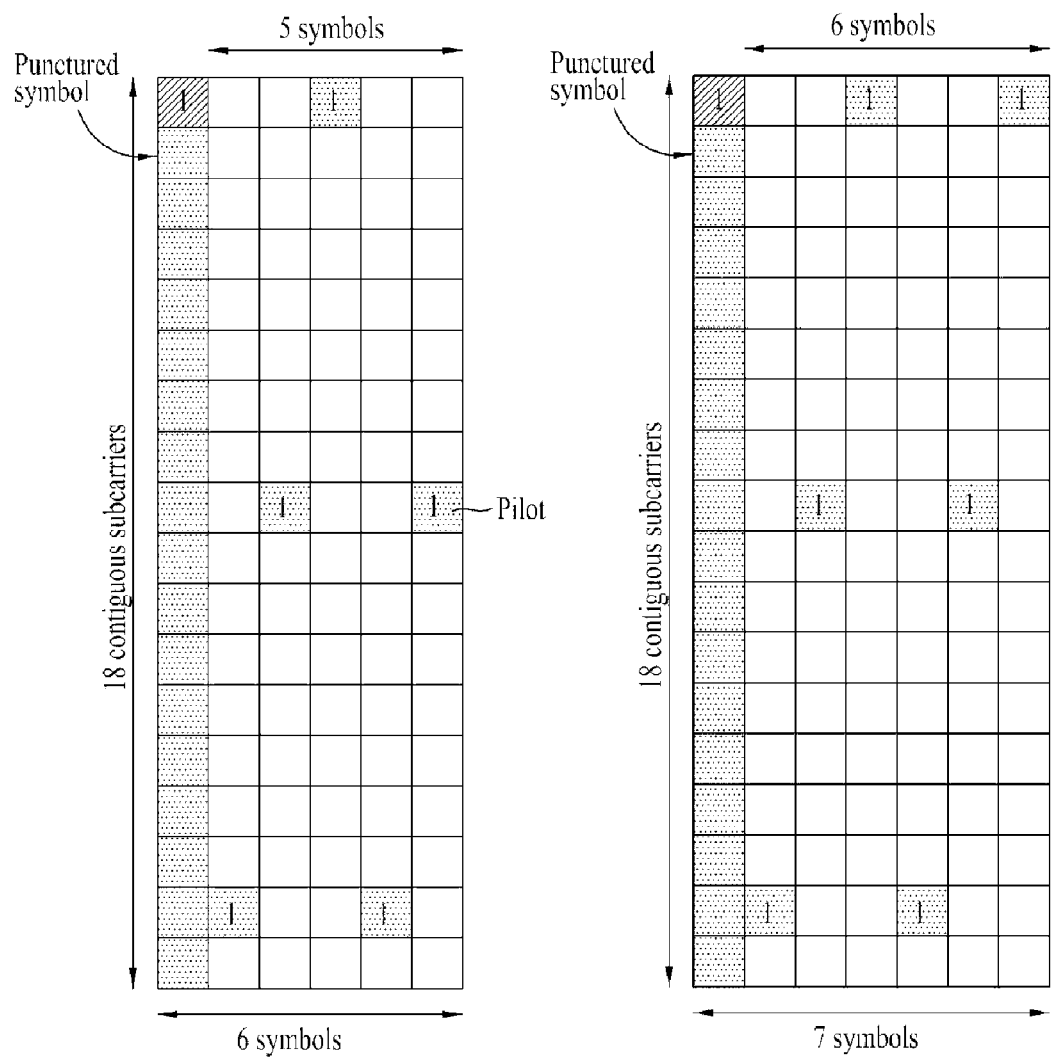
FIG. 6 is a diagram illustrating a structure of a subframe generated when a first symbol of the subframe is punctured to remove interference between frames in accordance with one embodiment of the present invention.

FIG. 6 is a diagram illustrating a structure of a subframe generated when a first symbol of the subframe is punctured to remove interference between frames in accordance with one embodiment of the present invention.

As illustrated in FIG. 6, an uplink control channel can be configured in the uplink region by using the third type subframe having five symbols not the first type subframe. At this time, since one symbol of the existing subframe is punctured, the uplink control channel can be used by the other symbols except for the corresponding symbol or the other mini-tiles except for a mini-tile having the punctured symbol. For example, the uplink control channel includes six consecutive subcarriers and six symbols. In this case, a feedback control channel includes three uplink feedback mini-tiles (FMT) having two consecutive subcarriers and six symbols. Also, an uplink HARQ feedback channel includes an uplink HARQ mini-tile (HMT) having two consecutive subcarriers and two symbols. Accordingly, a fast feedback channel uses the other symbols except for one symbol punctured in the FMT, and the HARQ feedback channel uses the other HMTs except for the mini-tile having the symbol punctured in the HMT.

In the uplink and downlink regions of the frame, information of puncture of the subframe or symbol overlapped with the frame having a different CP length is transferred from the base station through a super frame header (SFH), an advanced-MAP (A-MAP), additional broadcast information (ABI), or downlink message. If there is additional information which is not transmitted through the SFH, the ABI is used to transmit the information. The information transmitted through the downlink control message includes combination of a punctured subframe index of the uplink or downlink, a punctured symbol index of the uplink or downlink, the number of punctured subframes or symbols of the uplink or downlink, location of subframes or symbols in the uplink or downlink, or frame configuration information.

Figure 7:
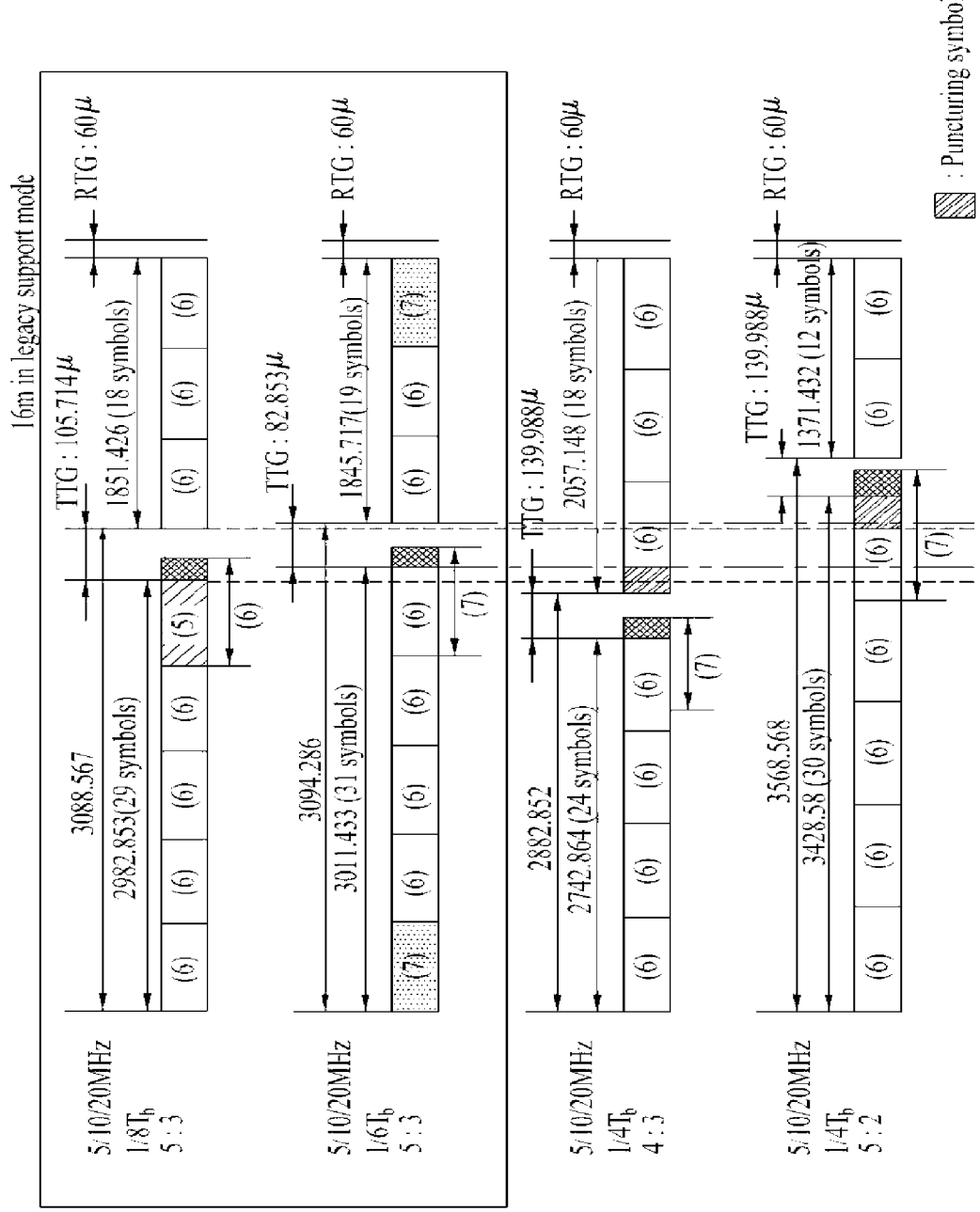
FIG. 7 is a diagram illustrating a frame puncturing a symbol, which has a CP length of $\frac{1}{4} T_b$ and is overlapped with a frame having another CP length, to remove interference between the frames when the frames are used together at bandwidths of 5, 10, and 20 MHz.
Figure 8:
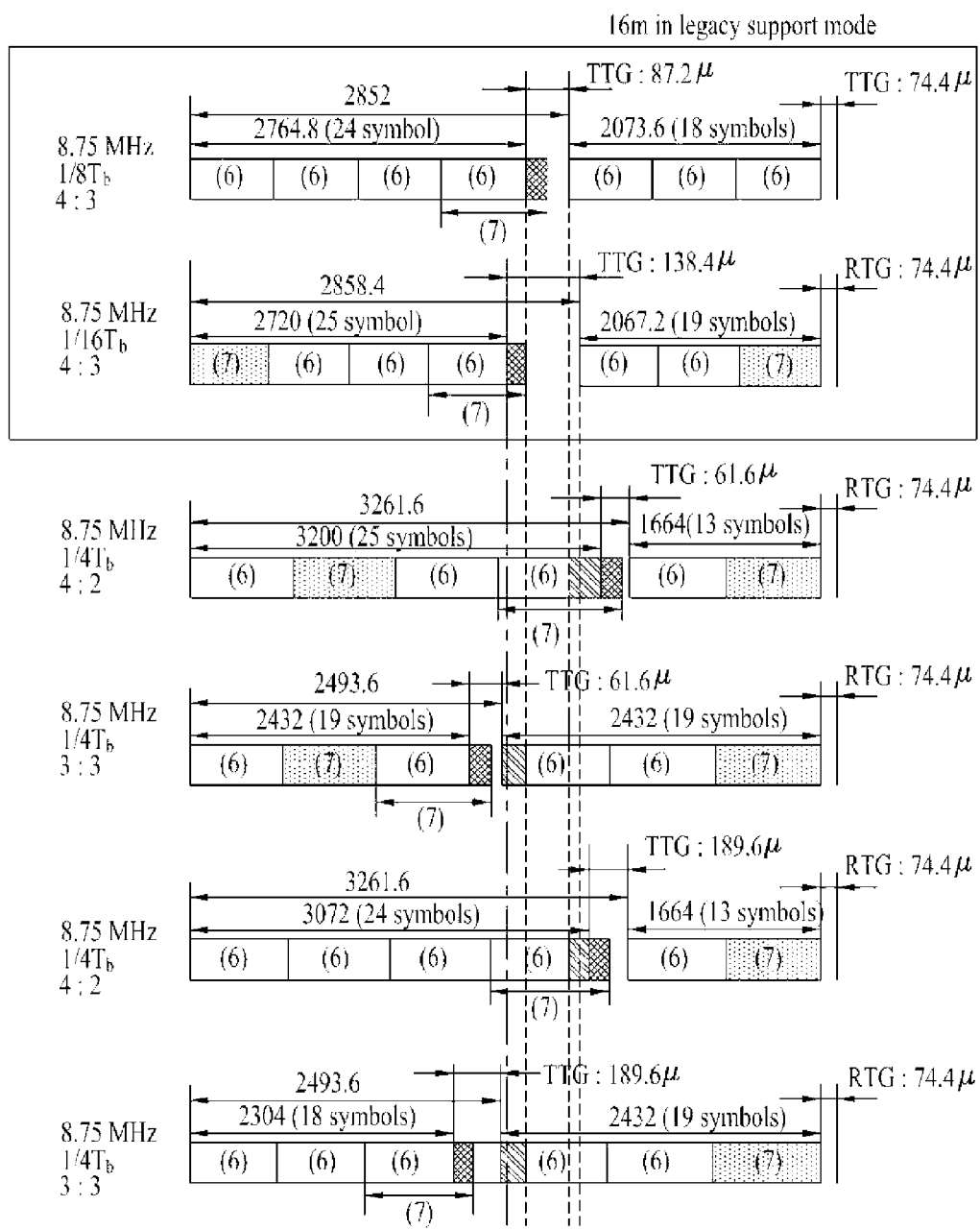
FIG. 8 is a diagram illustrating a frame puncturing a symbol, which has a CP length of $\frac{1}{4} T_b$ and is overlapped with a frame having another CP length, to remove interference between the frames when the frames are used together at a bandwidth of 8.75 MHz.
Figure 9:
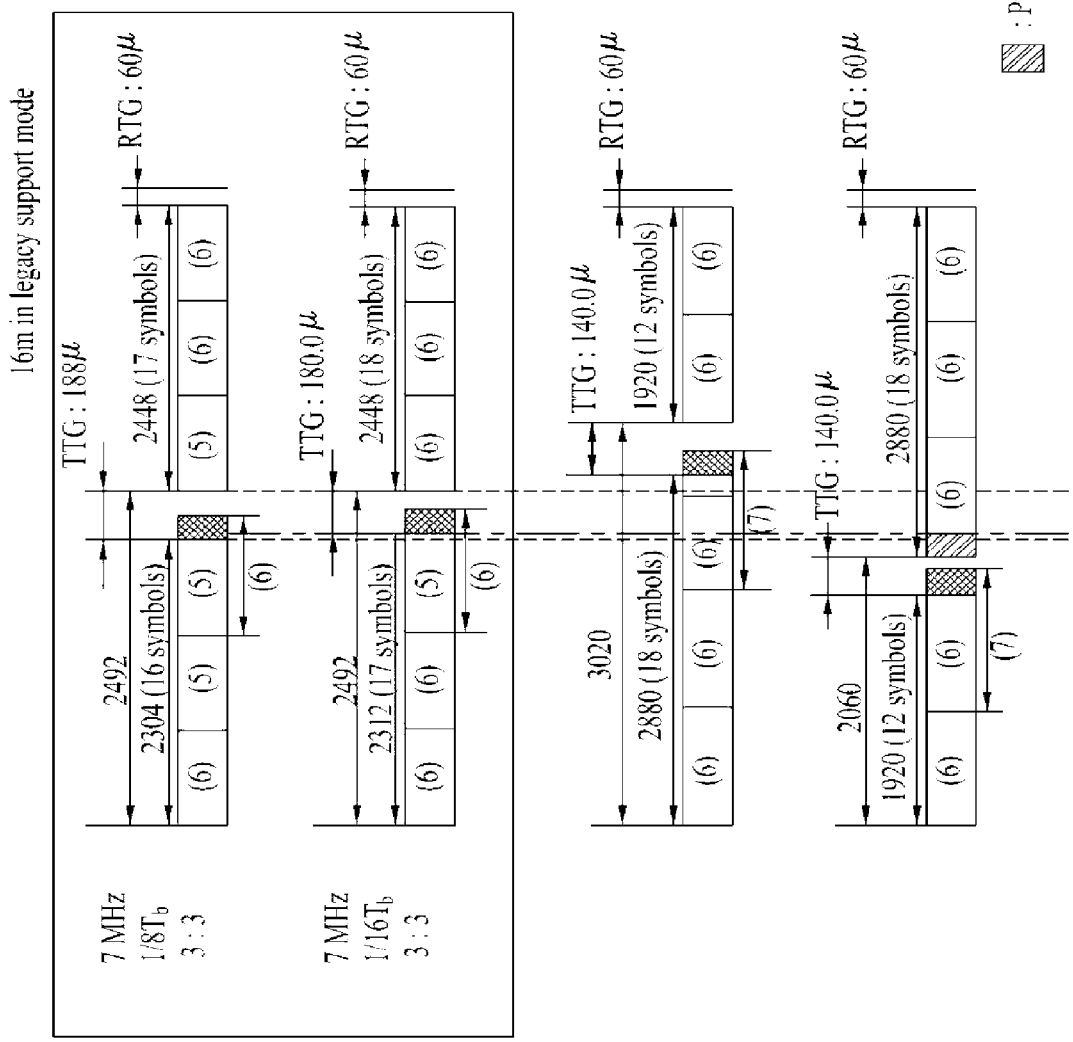
FIG. 9 is a diagram illustrating a frame puncturing a symbol, which has a CP length of $\frac{1}{4} T_b$ and is overlapped with a frame having another CP length, to remove interference between the frames when the frames are used together at a bandwidth of 7.

FIG. 7 to FIG. 9 are diagrams illustrating frames puncturing symbols or subframes overlapped in a downlink region and an uplink region between a frame having a CP length of ¼ $T_b$ and a frame having another CP length at respective bandwidths according to one embodiment of the present invention.

Particularly, FIG. 7 is a diagram illustrating a frame puncturing a symbol, which has a CP length of ¼ $T_b$ and is overlapped with a frame having another CP length, to remove interference between the frames when the frames are used together at bandwidths of 5, 10, and 20 MHz. In this case, a downlink to uplink ratio of the frame having another CP length is 5:3. If a downlink to uplink ratio of the frame having the CP length of ¼ $T_b$ is 5:2, the downlink region of the CP length of ¼ $T_b$ is overlapped with the uplink region of the frame having another CP length, whereby interference occurs. In this case, in order to avoid overlap between the downlink region of the frame having the CP length of ¼ $T_b$ and uplink region of the frame having another CP length (CP length of ⅛ $T_b$ or CP length of 1/16 $T_b$), the region corresponding to the overlap region at the last subframe having the CP length of ¼ $T_b$ is considered (½ round trip delay (RTD) is also considered) to puncture the symbol as much as the corresponding region, whereby downlink and uplink alignment between the frames having different CP lengths is performed to reduce interference between the frames having different CP lengths.

In above case, by considering the overlap region, at least three symbols or the overlapped subframes may be punctured to reduce interference between the frames having different CP lengths. In this case, the number of punctured symbols is uniformly applied regardless of the CP length of the frame.

As illustrated in FIG. 7, if a downlink to uplink ratio of the frame having the CP length of ¼ $T_b$ is 4:3, the downlink region of the frame having another CP length is overlapped with the uplink region of the frame having the CP length of ¼ $T_b$. In order to avoid such overlap, the overlapped symbol existing in the uplink region of the frame having the CP length of ¼ $T_b$ can be punctured, whereby interference between the two frames can be avoided.

At this time, one symbol is punctured in the uplink region of the frame having the CP length of ¼ $T_b$ when the frame having the CP length of ⅛ $T_b$ is used together. Two symbols are punctured in the uplink region of the frame having the CP length of ¼ $T_b$ when the frame having the CP length of 1/16 $T_b$ is used together. In this way, frame alignment between the frames having different CP lengths is performed and information of puncturing performed to reduce interference between the frames can be informed through the SFH, A-MAP or control information, which is transmitted from the frame. The number of the punctured symbols is transmitted using information of 2 bits or 3 bits, and the puncturing information includes the number of symbols and symbol location (notification of the downlink or uplink region, and subframe notification), wherein the number of symbols and symbol location may be transmitted together or separately. If the subframe is punctured, an idle state is notified, or subframe not used is notified. Alternatively, new frame configuration information may be transmitted through the SFH or A-MAP.

Although FIG. 7 illustrates an example of an available downlink to uplink ratio of 5:3, even in the case of another downlink to uplink ratio (for example, 2:6, 3:5, 4:4, 6:2, etc.), the symbol is punctured as above, whereby interference between the frames having different CP lengths can be removed. Also, in order to avoid overlap between the frames having different CP lengths and perform frame alignment, puncturing of the downlink or uplink symbol, which is performed at the frame having the CP length of ¼ $T_b$, can also be performed for the frame having another CP length (for example, CP length of ⅛ $T_b$ or CP length of 1/16 $T_b$). At this time, the number of the punctured symbols may be equal to or different from the number of the aforementioned symbols as the symbol length is varied depending on the CP length.

FIG. 8 is a diagram illustrating a frame puncturing a symbol, which has a CP length of ¼ $T_b$ and is overlapped with a frame having another CP length, to remove interference between the frames when the frames are used together at a bandwidth of 8.75 MHz. In the same manner as FIG. 7, FIG. 8 illustrates that a frame having a CP length of ¼ Tb is punctured when a downlink to uplink ratio of the frame having another CP length is 4:3. In order to perform frame alignment between frames having different CP lengths, the punctured symbol may be located in the downlink region or the uplink region.

If TTG of 189.6μ at the frame having the CP length of ¼ $T_b$ is used, it is considered that the symbol of the downlink region is punctured for alignment of the downlink and uplink switching points. At this time, for alignment with the frame having another CP length (for example, CP length of ⅛ $T_b$ or CP length of 1/16 $T_b$), the number of symbols punctured at the frame having the CP length of 1/4 $T_b$ is two, and the number of symbols punctured at the uplink region of the frame having the CP length of 1/4 $T_b$ is three when the frame having the CP length of 1/8 $T_b$ exists together. The number of symbols punctured at the uplink region of the frame having the CP length of 1/4 $T_b$ is two when the frame having the CP length of 1/16 $T_b$ exists together.

In another case, if TTG of 61.6μ is used at the frame having the CP length of 1/4 $T_b$, the number of symbols, which are punctured to align the switching point between the downlink and the uplink at the frame having the CP length of 1/4 $T_b$, with the switching point between the downlink and the uplink of the frame having the CP length of 1/8 $T_b$ or the CP length of 1/16 $T_b$, is three. If a downlink to uplink ratio of the frame having the CP length of 1/4 $T_b$ is 3:3, in order to avoid overlap at the uplink region, the number of the punctured symbols is three for the frame having the CP length of 1/8 $T_b$ and two for the frame having the CP length of 1/16 $T_b$ in the same manner as that TTG of 189.6μ is used.

Furthermore, if subframes overlapped between the frames having different CP lengths exist, the subframes are punctured to avoid overlap between the frames having different CP lengths.

Information of puncturing performed such that the frame having the CP length of 1/4 $T_b$ coexists with the frame having another CP length without any interference is transmitted using the SFH of the frame, A-MAP and control information. At this time, the puncturing information is transmitted using 2 bits or 3 bits within the control signal. For frame alignment, the puncturing information can be used for the other available downlink to uplink ratio in addition to the aforementioned downlink to uplink ratio, and interference between the coexisting frames can be reduced.

Furthermore, in order to avoid overlap between the frame having the CP length of 1/4 $T_b$ and the downlink or uplink region, the symbols overlapped at the downlink or uplink region are punctured as above at the frame having another CP length, whereby frame alignment can be obtained. At this time, the number of the punctured symbols may be equal to or different from the number of symbols of the frame having the CP length of 1/4 $T_b$ depending on symbol length of each CP length. Also, the number of the punctured symbols is transmitted using information of 2 bits to 3 bits in the same manner as above, and in this case, location information of the punctured symbols may be transmitted together or separately.

FIG. 9 is a diagram illustrating a frame puncturing a symbol, which has a CP length of 1/4 $T_b$ and is overlapped with a frame having another CP length, to remove interference between the frames when the frames are used together at a bandwidth of 7 MHz. Particularly, FIG. 9 illustrates that a downlink to uplink ratio at a frame having a CP length of 1/8 $T_b$ or a CP length of 1/16 $T_b$ is 3:3, and a downlink to uplink ratio at a frame having a CP length of 1/4 $T_b$ is 3:2 or 2:3.

First of all, if the downlink to uplink ratio at the frame having the CP length of 1/4 $T_b$ is 3:2, the downlink region of the frame having the CP length of 1/4 $T_b$ is overlapped with the uplink region of the frame having another CP length (for example, CP length of 1/8 $T_b$ or CP length of 1/16 $T_b$). Accordingly, in order to avoid such overlap and perform frame alignment, the number of symbols punctured at the downlink region of the frame having the CP length of 1/4 $T_b$ is three regardless of the CP length of the frame. In order to avoid overlap, the number of symbols punctured at the downlink region of the frame having the CP length of 1/4 $T_b$ is two regardless of the CP length of the frame.

Furthermore, if subframes overlapped between the frames having different CP lengths exist, the subframes are punctured to avoid overlap between the frames having different CP lengths. If symbols are punctured at the downlink region or the uplink region, the number of the punctured symbols and information of subframes are transmitted using the SFH of the frame, A-MAP, control information, etc. Information related to puncturing is transmitted within the control signal by using 2 bits to 3 bits. Also, location information of the punctured symbols can be transmitted together with the number of symbols or separately.

Although FIG. 9 illustrates that an available downlink to uplink ratio is 3:3, even in the case of another downlink to uplink ratio (for example, 2:6, 3:5, 4:4, 6:2, etc.), the symbol is punctured as above, whereby interference between the frames having different CP lengths can be removed. Also, in order to avoid overlap between the frames having different CP lengths and perform frame alignment, puncturing of the downlink or uplink symbol, which is performed at the frame having the CP length of 1/4 $T_b$, can also be performed for the frame having another CP length (for example, CP length of 1/8 $T_b$ or CP length of 1/16 $T_b$). At this time, the number of the punctured symbols may be equal to or different from the number of the aforementioned symbols as the symbol length is varied depending on the CP length.

Also, puncturing information for puncturing a symbol includes combination of one or more of the number of punctured symbols, index of subframes having the punctured symbols, location of the punctured symbols. The puncturing information can be transmitted using the SFH of the frame, A-MAP and control information. Moreover, as described above, in order that the uplink region and the downlink region between the frame having the CP length of 1/4 $T_b$ and the frame having another CP length are not overlapped with each other, the corresponding symbol is punctured at the overlap region in the structure having different CP lengths, whereby frame alignment can be obtained.

Figure 10:
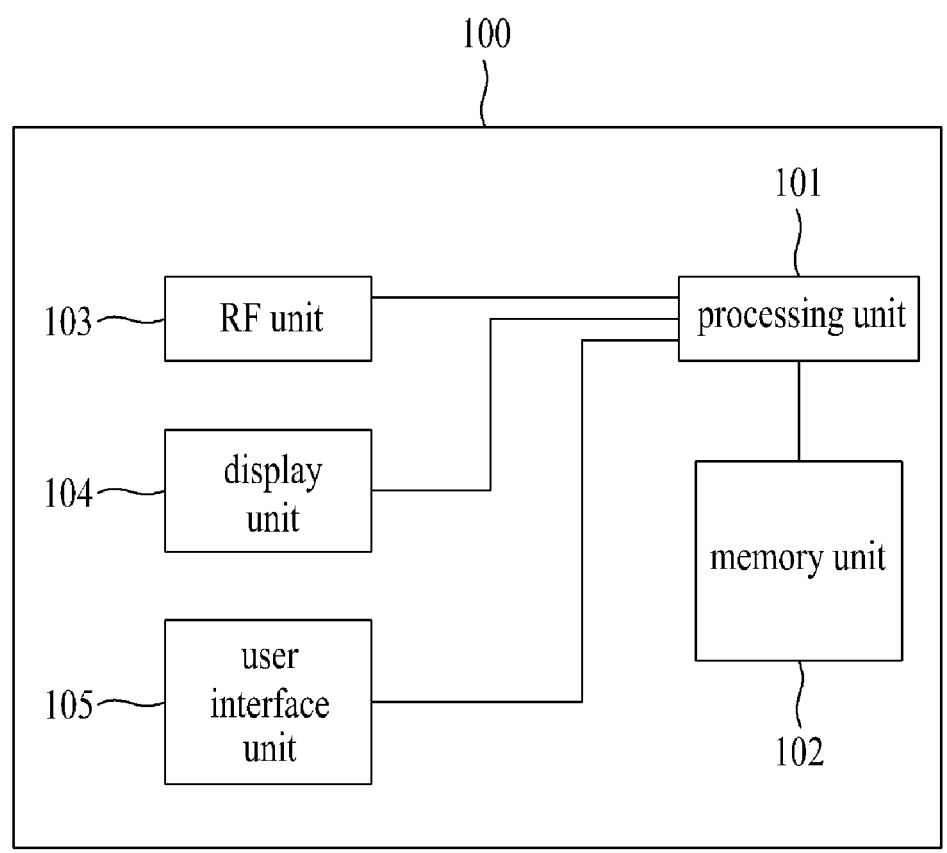
FIG. 10 is a block diagram illustrating a configuration of a device that can be applied to a user equipment or a base station, through which the present invention can be carried out.

FIG. 10 is a block diagram illustrating a configuration of a device that can be applied to a user equipment or a base station, through which the present invention can be carried out. As illustrated in FIG. 10, the device 100 includes a processing unit 101, a memory unit 102, a radio frequency (RF) unit 103, a display unit 104 and a user interface unit 105. A layer of a physical interface protocol is performed in the processing unit 101. The processing unit 101 provides a control plane and a user plane. A function of each layer can be performed in the processing unit 101. The memory unit 102 is electrically connected with the processing unit 101 and stores an operating system, application program, and general files. If the device 100 is a user equipment, the display unit 104 can display various kinds of information, and can be implemented using LCD (Liquid Crystal Display), OLED (Organic Light Emitting Diode), etc., which are known. The user interface unit 105 and can be configured by combination of well known user interfaces such as key pad and touch screen. The RF unit 103 is electrically connected with the processing unit 101, controlled by the processing unit 101, and transmits or receives a radio signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs procedures or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a user equipment, a base station, or other equipment of a wireless communication system.

The invention claimed is:

1. A method for transmitting a signal using a frame having a predetermined cyclic prefix (CP) length in a wireless communication system that supports a plurality of cells, the method comprising: receiving the signal using a first frame from a base station; and transmitting the signal to the base station using the first frame, wherein the first frame is supported by a first cell of the plurality of cells and is different from a second frame supported by a second cell of the plurality of cells, the first frame has a structure where a overlap region between an uplink region of the first frame and a downlink region of the second frame or an overlap region between a downlink region of the first frame and an uplink region of the second frame is punctured, and a CP length of the first frame is different from that of the second frame.

2. The method of claim 1, wherein the CP length of the first frame is ¼ of a useful symbol length, and the number of subframes included in the first frame is smaller than the number of subframes included the second frame by 1.

3. The method of claim 2, wherein, if the downlink region of the first frame is overlapped with the uplink region of the second frame, a predetermined number of symbols of a last subframe of downlink subframes of the first frame are punctured.

4. The method of claim 2, wherein, if the uplink region of the first frame is overlapped with the downlink region of the second frame, a predetermined number of symbols of a first subframe of uplink subframes of the first frame are punctured.

5. The method of claim 2, wherein a subframe that includes the overlapped region is punctured at the first frame.

6. The method of claim 1, wherein the first frame and the second frame are time division duplex (TDD) frames.

7. The method of claim 1, further comprising receiving information of the punctured region.

8. The method of claim 7, wherein the information of the punctured region includes information of the punctured symbol or the punctured subframe.

9. A user equipment in a wireless communication system that supports a plurality of cells, the user equipment comprising:
a receiving unit receiving a signal using a first frame from a base station;
a transmitting unit transmitting the signal to the base station using the first frame; and
a processing unit controlling the receiving unit and the transmitting unit,
wherein the system supports a plurality of cells, the first frame is supported by a first cell of the plurality of cells and is different from a second frame supported by a second cell of the plurality of cells, the first frame has a structure where a overlap region between an uplink region of the first frame and a downlink region of the second frame or an overlap region between a downlink region of the first frame and an uplink region of the second frame is punctured, and a CP length of the first frame is different from that of the second frame.

10. The user equipment of claim 9, wherein the CP length of the first frame is ¼ of a useful symbol length, and the number of subframes included the first frame is smaller than the number of subframes included in the second frame by 1.

11. The user equipment of claim 10, wherein, if the downlink region of the first frame is overlapped with the uplink region of the second frame, a predetermined number of symbols of a last subframe of downlink subframes of the first frame are punctured.

12. The user equipment of claim 10, wherein, if the uplink region of the first frame is overlapped with the downlink region of the second frame, a predetermined number of symbols of a first subframe of uplink subframes of the first frame are punctured.

13. The user equipment of claim 10, wherein a subframe that includes the overlapped region is punctured at the first frame.

14. The user equipment of claim 9, wherein the first frame and the second frame are time division duplex (TDD) frames.

15. The user equipment of claim 9, wherein the receiving unit receives information of the punctured region.

16. The user equipment of claim 15, wherein the information of the punctured region includes information of the punctured symbol or the punctured subframe.

* * * * *